(12) United States Patent
Gupta

(10) Patent No.: US 9,191,844 B2
(45) Date of Patent: Nov. 17, 2015

(54) SYSTEMS AND METHODS FOR PHASE DETERMINATION OVER A WIRELESS LINK

(71) Applicant: Aviat U.S., Inc., Santa Clara, CA (US)

(72) Inventor: Anurag Gupta, San Jose, CA (US)

(73) Assignee: Aviat U.S., Inc., Santa Clara, CA (US)

(*) Notice: Subject to any disclaimer, the term of this patent is extended or adjusted under 35 U.S.C. 154(b) by 160 days.

(21) Appl. No.: 13/965,060

(22) Filed: Aug. 12, 2013

(65) Prior Publication Data

US 2014/0043991 A1 Feb. 13, 2014

Related U.S. Application Data

(60) Provisional application No. 61/682,176, filed on Aug. 10, 2012.

(51) Int. Cl.
H04W 24/08 (2009.01)

(52) U.S. Cl.
CPC .................. *H04W 24/08* (2013.01)

(58) Field of Classification Search
CPC .................................................. H04W 24/08
See application file for complete search history.

(56) References Cited

U.S. PATENT DOCUMENTS

| 6,453,168 B1* | 9/2002 | McCrady et al. ............. 455/517 |
| 7,474,265 B1 | 1/2009 | Small |
| 2010/0020909 A1* | 1/2010 | Jung et al. ..................... 375/371 |

OTHER PUBLICATIONS

International Application No. PCT/US2013/054578, International Search Report and Written Opinion mailed Jan. 17, 2014.

\* cited by examiner

*Primary Examiner* — Chirag Shah
*Assistant Examiner* — Rina Pancholi
(74) *Attorney, Agent, or Firm* — Sheppard, Mullin, Richter & Hampton LLP

(57) ABSTRACT

An exemplary method to measure propagation of a signal between a first end data input transmit system and a first end transmit air frame detector, of the signal between a second end receive air frame detector and a second end data receive system, of the signal between the second end data receive system and a second end data input transmit system, of a time the signal is received by the second end data transmit system and a signal is received at a second end transmit air frame detector, of the signal between a first end receive air frame detector and a first end data receive system, and of a time when the signal is in the first end data receive system and when the signal is received by the first end data input transmit system, and determine a performance of the signal across a wireless link based on the measurements.

17 Claims, 7 Drawing Sheets

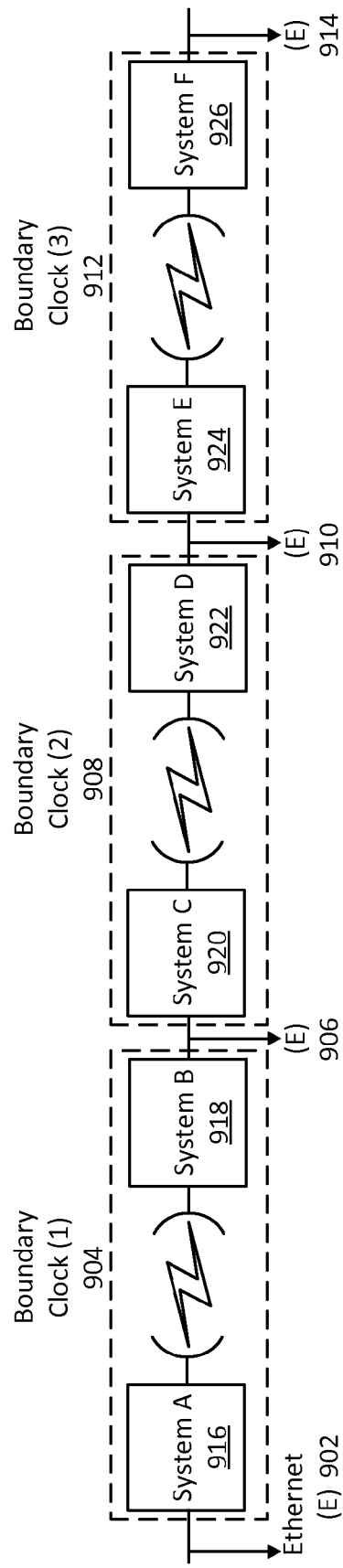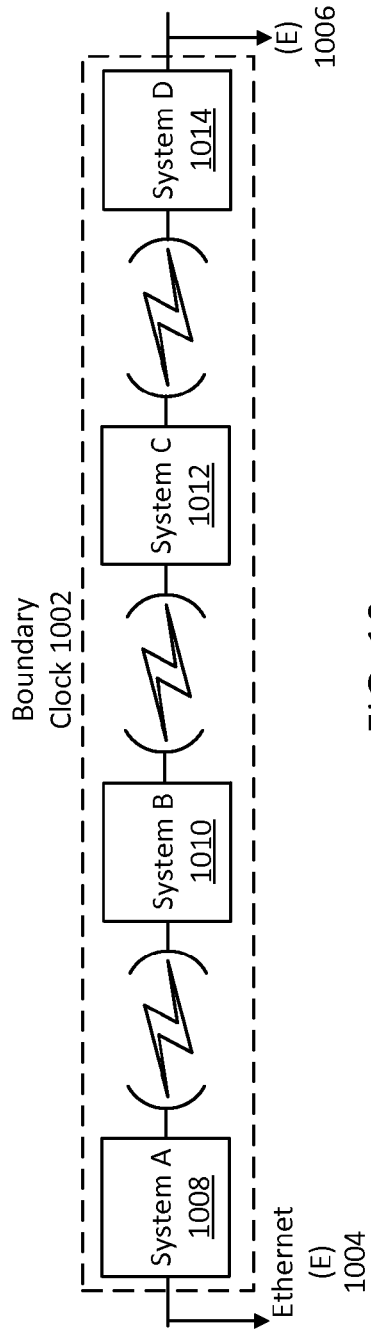

SYSTEMS AND METHODS FOR PHASE DETERMINATION OVER A WIRELESS LINK

CROSS-REFERENCE TO RELATED APPLICATIONS

The present application claims benefit of U.S. Provisional Patent Application No. 61/682,176 filed Aug. 10, 2012, and entitled "Deterministic Phase Transfer over Microwave Links," which is incorporated by reference herein.

BACKGROUND

1. Field of the Invention(s)

The present invention(s) generally relate to transceiver communications. More particularly, the invention(s) relate to systems and methods for phase determination over a wireless link.

2. Description of Related Art

Terrestrial networks, which are composed of wires typically buried underground, transfer frequency from one end to the other. Phase transfer across terrestrial networks typically relies on one or more estimations of the phase. For example, the far side of a terrestrial network may estimate the phase of the signal received from the near side.

Terrestrial phase estimation techniques are impractical over wireless networks due to changes in the wireless link. Wireless networks often have dynamic links where performance varies over time. As a result of such dynamic links (e.g., fading caused by environmental factors or interference caused by other electrical systems), terrestrial techniques to estimate phase may lead to errors. Further, correcting the phase (e.g., based on further estimations) based on terrestrial phase estimations may be insufficient and/or may compound error.

SUMMARY OF THE INVENTION

In various embodiments, systems and methods for phase determination over a wireless link are discussed. An exemplary method comprises measuring a first time for a first signal to propagate between a point in a first end data input transmit system and a point in a first end transmit air frame detector, measuring a second time for the first signal to propagate between a point in a second end receive air frame detector and a point in a second end data receive system, measuring a third time for the first signal to propagate between the point in the second end data receive system and a point in a second end data input transmit system, measuring a fourth time for the first signal to be received by the point in the second end data transmit system and a second signal to be received at a point in a second end transmit air frame detector, measuring a fifth time for the second signal to propagate between a point in a first end receive air frame detector and a point in a first end data receive system, measuring a sixth time based on when the second signal is by the point in the first end data receive system to when the first signal is received by the point in the first end data input transmit system, and determining a seventh time for the first data to propagate between the point in the first end transmit airframe detector and the point in the second end receive air frame detector based on the first, second, third, fourth, fifth and sixth time.

In various embodiments, determining the seventh time comprises subtracting the first time, the second time, the third time, the fourth time, and the fifth time from the sixth time to determine a link time, and dividing the link time by two.

In some embodiments, seventh time is a time for the first signal to propagate across a wireless link between two transceivers. Further, in some embodiments, the method further comprises determining an eighth time equivalent to the seventh time, the eighth time being a time for the second signal to propagate across the wireless link between the point in the second end transmit air frame detector to the first point in the first end receive air frame detector.

The wireless link may be a microwave link. The wireless link may be an RF link. In some embodiments, the first signal may be the second signal.

In various embodiments, the method may further comprise determining phase based on the seventh time. Frequency may be locked between a first end transceiver and a second end transceiver, wherein the first end transceiver comprises the first end data input transmit system, the first end transmit air frame detector, the first end receive air frame detector, and the first end data receive system, further wherein the second end transceiver comprises the second end data input transmit system, the second end transmit air frame detector, the second end receive air frame detector, and the second end data receive system. The determined phase may be provided from a first end transceiver across a network to a second end transceiver. In some embodiments, the determined phase is provided from the first end transceiver to the second end transceiver within overhead of third data transmitted from the first end transceiver to the second end transceiver. The determined phase may be provided from the first end transceiver to the second end transceiver over a dedicated channel.

The second end transceiver may utilize the determined phase as a backup to GPS functions. The method may further comprise determining when third data is to be received at a predetermined point in a second end transceiver and providing a time, based on the determination, to the second end to transfer a clock value.

An exemplary system may comprise a first end transceiver, a second end transceiver, a phase determination module and a communication module. The first end transceiver may comprise a controller configured to measure a first time for first signal to propagate between a point in a first end data input transmit system and a point in a first end transmit air frame detector, measure a fifth time for second signal to propagate between a point in a first end receive air frame detector and a point in a first end data receive system, and a sixth time for the second signal to propagate between the point in the first end data receive system and the point in the first end data input transmit system. The second end transceiver may comprise a controller configured to measure a second time for the first signal to propagate between a point in a second end receive air frame detector and a point in a second end data receive system, a third time for the second signal to propagate between the point in the second end data receive system and a point in a second end data input transmit system, and a fourth time for the second signal to propagate between the point in the second end data transmit system and a point in a second end transmit air frame detector. A phase determination module may be configured to determine a seventh time for the first signal to propagate between the point in the first end transmit airframe detector and the point in the second end receive air frame detector based on the first, second, third, fourth, fifth, and sixth time and determine a phase of a signal at a predetermined point in the second end based on the seventh time. The communication module may be configured to provide the information regarding the determined phase from the first end transceiver to the second end transceiver.

In various embodiments, the second end transceiver is configured to recover phase based on the information regarding the determined phase. In some embodiments, the second end transceiver is configured to recover a clock signal based on the information regarding the determined phase. A frequency may be locked between the first end transceiver and the second end transceiver.

A system may comprise a memory, processor, and a controller. The controller may be utilized by the processor to generate measurements of a first signal propagation along a transmit path of a first transceiver, generate measurements of a second signal propagation along a receive path of the first transceiver, determine total time based on a final measurement of a second signal propagation to initiation of initial measurement of first signal propagation, receive measurements of signal propagation from second transceiver in communication with a first transceiver, determine time of signal propagation over wireless link between the first and second transceivers, determine phase information, and provide phase information to second transceiver.

BRIEF DESCRIPTION OF THE DRAWINGS

FIG. 9 is a block diagram for determining and providing phase and/or time information in a system of distributed boundary clocks in some embodiments.

FIG. 10 is a block diagram for determining and providing phase and/or time information in a system of a single boundary clock in some embodiments.

DETAILED DESCRIPTION OF THE INVENTION

In various embodiments, a means for phase determination and transfer across wireless (e.g., microwave) links is disclosed. In some embodiments, time of signal propagation over a wireless link may be calculated based on time measurements of signal propagation along transmit and receive paths of two transceivers. The time of signal propagation over the wireless link and/or other measurements may allow for the calculation of phase. The phase (or information related to the phase) may be provided from one transceiver to the other. As a result of utilizing measurement techniques to determine and transfer phase, for example, accuracy may be improved, variation reduced, and/or lock times may be faster. In some embodiments, similar techniques may be used to determined and transfer time, time of day, and/or frequency.

Those skilled in the art will appreciate that frequency and phase transfer is increasingly important. For example, mobile technologies, such as those that rely on LTE, may increasingly rely on phase transfer. In some embodiments, time of day may be transferred over wireless (e.g., microwave links). In various embodiments, at least some systems and methods described herein may be utilized to back up GPS against local jamming or interference for protection of critical infrastructure.

Figure 1:
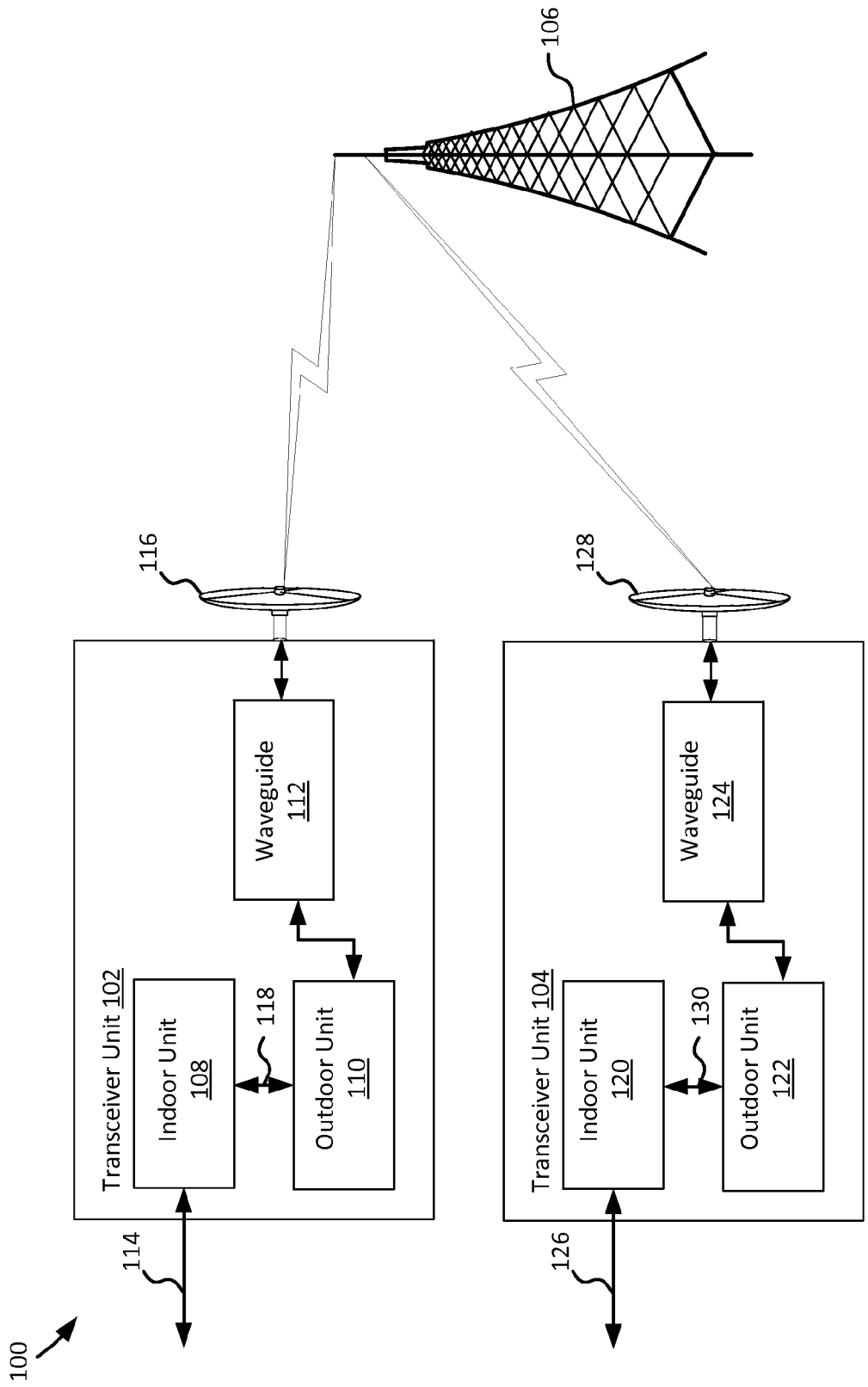
FIG. 1 is an environment including two transceiver units in some embodiments.

FIG. 1 is an environment 100 including two transceiver units 102 and 104 in some embodiments. Each of the transceiver units 102 and 104 are split mount radios. A split-mount radio has a part of the electronics mounted outdoors with an antenna and part indoors. The outdoor unit (ODU) may be the RF transmitter/receiver. The indoor unit (IDU) contains the modulator/demodulator, multiplexer, control, and traffic interface elements. The IDU and ODU may be coupled together using a cable. By comparison, an all-indoor radio has all radio equipment installed inside and is connected to its antenna using a waveguide or coax feeder. A split-mount radio may be a point-to-point radio installation for licensed 6 to 38+ GHz frequency bands with the ODU direct-mounted to the rear of the antenna to provide an integral antenna feed. By having the ODU mounted with the antenna, split-mount may eliminate or reduce feeder losses, minimize or reduce rack occupancy, and/or lower installed costs compared to indoor radios.

For example, transceiver unit 102 may comprise an indoor unit (IDU) 108 in communication with a processor and/or a digital device, an outdoor unit (ODU) 110 in communication with the IDU 108 over cables 118, a waveguide 112 in communication with the ODU 110, and an antenna 116. The IDU 108 may comprise a modulator/demodulator and control circuitry for providing data from a digital device or a processor over line 114 to the antenna 116 via the ODU 110 and/or the waveguide 112. Similarly, the IDU 108 may also be configured to receive information from the antenna 116 via the ODU 110 for providing to the digital device or processor via the line 114. The ODU 110 may comprise an RF transmitter/receiver and be coupled with the antenna 116. The waveguide 112 may or may not be a part of the ODU 110.

The IDU 108 of the transceiver unit 102 may be coupled to the ODU 110 utilizing a coaxial cable 118. Although only one coaxial cable 118 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

Similarly, transceiver unit 104 may comprise an IDU 120 in communication with a processor and/or a digital device, an ODU 122 in communication with the IDU 120 over cable 130, a waveguide 124 in communication with the ODU 122, and an antenna 128. The IDU 120 may comprise a modulator/demodulator and control circuitry for providing data from a digital device or a processor over line 126 to the antenna 128 via the ODU 122 and/or the waveguide 124. Similarly, the IDU 120 may also be configured to receive information from the antenna 128 via the ODU 122 for providing to the digital device or processor via the line 126. The ODU 122 may comprise an RF transmitter/receiver and be coupled with the antenna 128. The waveguide 124 may or may not be a part of the ODU 122.

The IDU 120 of the transceiver unit 104 may be coupled to the ODU 122 utilizing a coaxial cable 130. Although only one coaxial cable 130 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

In various embodiments, the IDU 108 communicates with the ODU 110 via one or more coaxial cables. During transmission, information received via the line 114 may be modulated and provided over the coaxial cables 118 to the ODU 110.

In various embodiments, transceiver unit 102 and transceiver unit 104 may each comprise a transmit path and a receive path. The transmit path is a path in which a signal may propagate, be processed (e.g., upconverted, gain adjusted, power amplified, noise reduced, and/or the like), and be transmitted (e.g., to another transceiver unit over a wireless link. The receive path is a path in which a signal may be received (e.g., from another transceiver unit over a wireless link), propagate, and be processed (e.g., downconverted, gain adjusted, and/or the like).

Measurements of signal propagation over the paths may be utilized to determine a time for signal propagation over the wireless link (e.g., from antenna 116 to antenna 128). These measurements may be used to determine phase and/or time as discussed herein. In various embodiments, multiple measurements are taken utilizing different signals to improve measurement accuracy.

In various embodiments, each transceiver unit comprises a measurement controller (e.g., controller) which may measure or receive time measurements based on signal propagation. For example, the measurement controller may initiate a counter when a first signal is at one point on a transmit path of the transceiver unit 102 and may terminate the counter when the first signal is detected at a second point in the transmit path. Similarly, the measurement controller may initiate a counter when a second signal received from another transceiver is detected at a first point in the receive path and may terminate the counter when the second signal is detected at a second point in the transmit path. The measurement controller, for example, may measure the time of signal propagation between two points. In some embodiments, the measurement controller may receive time measurements of signal propagation over paths in another transceiver. The measurement controller may determine the time of signal propagation over the wireless link between two transceivers as discussed herein. In some embodiments, the measurement controller may provide measurements to one or more other transceivers.

The controller may be utilized be a processor. In various embodiments, a transceiver comprises a processor and memory.

In various embodiments, a phase determination module (not depicted) in at least one of the transceiver units may determine phase and/or time based on the measurements and the determined time of signal propagation over the wireless link utilizing systems and methods described herein.

The phase determination module may provide the phase and/or time to another transceiver unit. In various embodiments, the phase determination module may provide phase information (e.g., information with which another transceiver may receive or recover phase) and/or time information within data overhead. In some embodiments, the phase determination module may provide the phase and/or time information to another transceiver unit as a separate data communication and/over out of band (e.g., utilizing a different network).

Those skilled in the art will appreciate that the transceiver unit 104 may perform in a manner similar to the transceiver 102. In various embodiments, the two transceiver units 102 and 104 may be in communication with each other over a wireless communication tower 106. Those skilled in the art will appreciate that the transceiver units 102 and 104, individually or together, may communicate with any digital device or receiver.

The wireless communication tower 106 (e.g., cell tower or other microwave radio device) may be any device configured to receive and/or transmit wireless information.

In various embodiments, systems and methods of transferring phase and/or time over the microwave or radio links is discussed. The phase and/or time may be provided along with data (e.g., this transfer may be over non-dedicated links). In various embodiments, measurement techniques (rather than estimation techniques of terrestrial networks) may determine phase of a source clock. This technique may translate into better accuracy, lower variation and faster lock times at the destination.

Figure 2:
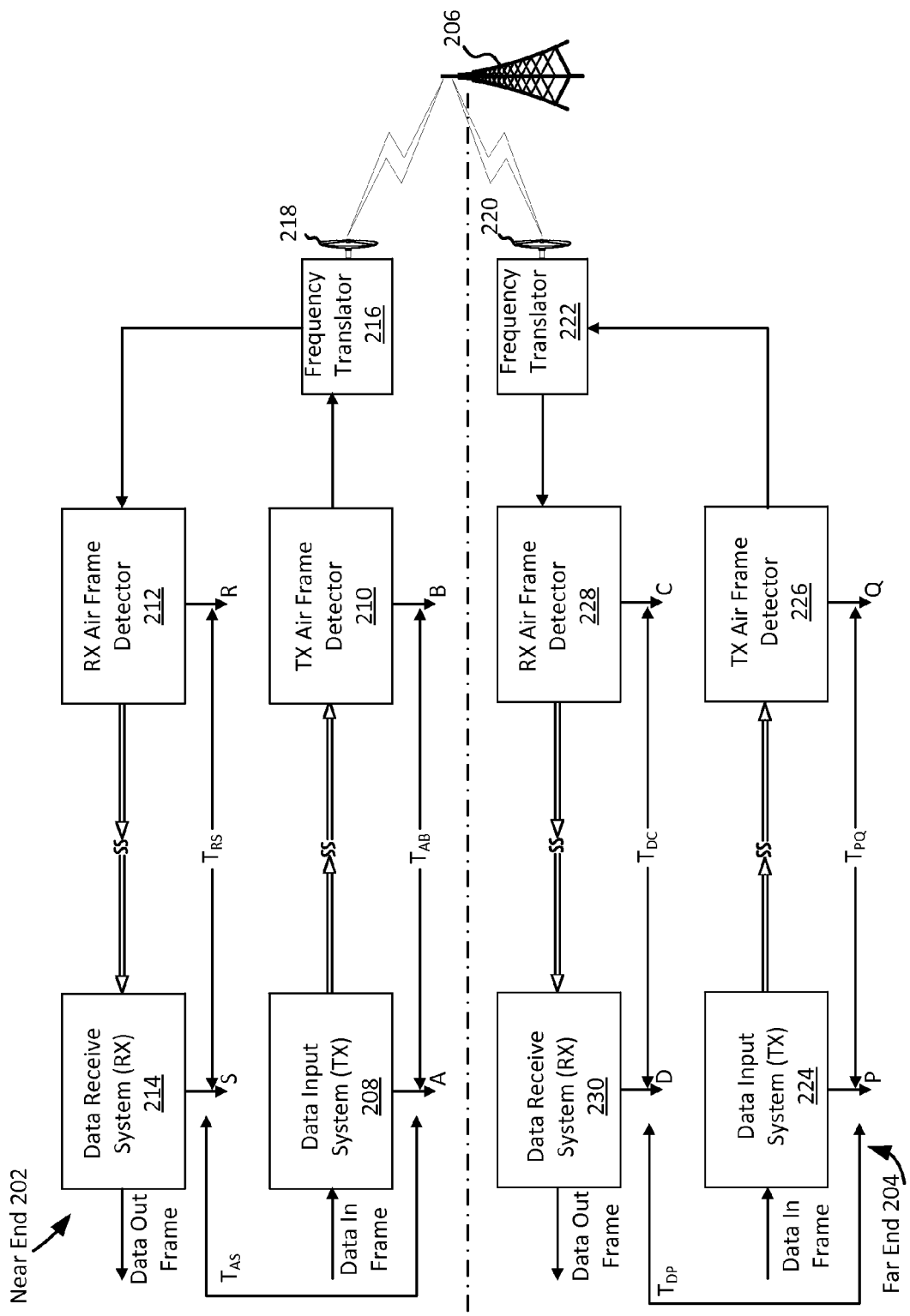
FIG. 2 is a block diagram for determining phase over a wireless link in some embodiments.

FIG. 2 is a block diagram for determining phase over a wireless link in some embodiments. Time measurements of signal propagation may be taken by two or more ends (e.g., two or more transceivers) of a wireless link. For example, a time measurement may be taken for the time a signal passes from one component or point to another. In some embodiments, the time measurements of signal propagation may be taken from two ends of a wireless link to determine the time of propagation of the signal across the wireless link. These measurements may be utilized to measure or calculate phase and/or time.

The determined phase and/or time may be transferred over the link to the other unit. In some embodiments, information regarding the determined phase and/or time may be transferred over the link and the information may allow for phase and/or time determination, confirmation, or recovery.

FIG. 2 comprises a near end 202 in communication with a far end 204 over a communication tower 206. The near end 202 and the far end 204 may be transceivers. The near end 202 may comprise a transmit path and a receive path. The transmit path may comprise a data input transmit system 208 and a transmit air frame detector 210. The receive path may comprise a receive air frame detector 212 and a data receive system 214.

The transmit path of the near end 202 may provide signals to be transmitted over a frequency translator 216 and an antenna 218. The receive path of the near end 202 may receive signals from the antenna 218 over the frequency translator 216.

The far end transceiver 204 may also comprise a transmit path and a receive path. The transmit path may comprise a data input transmit system 224 and a transmit air frame detector 226. The receive path may comprise a receive air frame detector 228 and a data receive system 230.

The transmit path of the far end 204 may provide signals to be transmitted over a frequency translator 222 and an antenna 220. The receive path of the far end 204 may receive signals from the antenna 220 over the frequency translator 222.

Those skilled in the art will appreciate that the data input transmit system 208, the transmit air frame detector 210, the receive air frame detector 212, the data receive system 214, the data input transmit system 224, the transmit air frame detector 226, the receive air frame detector 228, and the data receive system 230 may be components or points using which measurements may be made (e.g., counters initiated and/or terminated to measure a time of signal propagation from or to another component or point).

As discussed herein, the near end 202 and the far end 204 may comprise transceivers. For example, the near end 202 may comprise all or part of transceiver unit 102 and the far end 204 may comprise all or part of the transceiver unit 104 (See FIG. 1). Those skilled in the art will appreciate that the near end 202 may or may not comprise a split mount radio. Similarly, the far end 204 may or may not comprise a split mount radio. The near end 202 and the far end 204 may or may not comprise similar components. The communication tower 206 may similarly comprise the communication tower 106 of FIG. 1.

In some embodiments, the near end 202 and the far end 204 are transceivers that communicate over a wireless link such as, for example, a microwave link. The wireless link may be any wireless link including, for example, WiFi, cellular, or RF link.

The frequency translator 216 may be an upconverter and/or downconverter. For example, signals to be transmitted may be upconverted to an RF frequency for transmission over the antenna 218 to the far end 204 (e.g., to the antenna 220 via the communication tower 206). The frequency translator 216 may also downconvert signals received from the far end 204. In one example, the frequency translator 216 may downconvert RF signals received from the far end 204 to IF signals before providing the IF signals to the receive air frame detector 212.

Similarly, the frequency translator 222 may be an upconverter and/or downconverter. For example, signals to be transmitted may be upconverted to an RF frequency for transmission over the antenna 222 to the near end 202. The frequency translator 222 may also downconvert signals received from the near end 202. In one example, the frequency translator 222 may downconvert RF signals received from the near end 202 to IF signals before providing the IF signals to the receive air frame detector 228.

In various embodiments, the near end 202 and/or the far end 204 are configured to receive signals from customer equipment, modulate the received signal, upconvert the received signal to IF signal, process the IF signal (e.g., adjust gain and/or amplify power), upconvert the IF signal to an RF signal (e.g., by the frequency translator), direct the RF signal to an antenna via a waveguide, and transmit the RF signal to the other side (e.g., from the near end 202 to the far end 204 or from the far end 204 to the near end 202). Similarly, the near end 202 and/or the far end 204 may be configured to receive an RF signal from the other side Generally, data or signal propagation over portions of the transmit and receive paths of the near end 202 and the far end 204 may be measured to determine data or signal propagation over the wireless link. Using this information, phase may be determined. The determined phase and/or information related to the determined phase may be provided to either end (e.g., for transfer of phase from one end to another). The information may further be utilized to transfer time or transfer information for the confirmation or recovery of time from one end to the other.

Frequency between the near end 202 and the far end 204 may be locked or otherwise known between the two ends. For example, the near end 202 and/or the far end may comprise a phase lock loop to lock local frequency. The frequency and/or frequency information may be shared or transferred between the near end 202 and the far end 204 in any number of ways. For example, a frequency or originating frequency difference may be provided from the near end 202 to the far end 204 (e.g., within the overhead of data transmitted between the two ends). The frequency, in some examples, may be recovered at the opposite end. In some embodiments, transfer of frequency may be achieved by synchronizing a modem symbol clock to a clock reference input.

Even with a known frequency, however, there may be phase variation. For example, suppose sourcing was divided such that a 100 Hz clock is divided to one pulse per second. At the destination, the alignment of edges of the signal may be unknown. As a result, where the beginning or ending of a counter or epoch may be unknown.

In various embodiments, a common frequency reference may be established between the near end 202 and the far end 204. Clocks running on the common frequency may be referred to as CCLK.

In some embodiments, the beginning of an air frame may be used as a point of reference for measurements. Beginning with the forward transmit path of the near end 202, a signal may be received (e.g., the signal or data carried by the signal being from customer premises equipment) via the data in frame. A time difference for signal propagation along the transmit path of the near end 202 is measured between point A (data input system 208) and point B (transmit air frame detector 210). For example, a counter may begin at the data input system 208 and the counter may terminate as data is received by is propagated to the transmit air frame detector 210 (or a point in the air frame detector 210). In some embodiments, any marker may be used (e.g., at the beginning of an air frame) for measurement. Timestamps may be utilized, counters, or any number of different techniques may be used for time measurements. Although counters are discussed elsewhere, those skilled in the art will appreciate that any technique for time measurement may be utilized. The time of data propagation from point A to point B is denoted as $T_{AB}$ (e.g., a first time is measured).

Times within the near end 202 may be measured, for example, using $CCLK_{(master)}$. The $CCLK_{(master)}$ may run on a common synchronized frequency. Times within the far end 204 may be measured using $CCLK_{(slave)}$ which may run on the common synchronized frequency.

The signal may be upconverted by the frequency translator 216 before being provided over the wireless link by the antenna 218. The signal may be received by antenna 220 via the communication tower 206. The path between the antenna 218 and the antenna 220 is termed herein as a first wireless link.

The signal from the near end 202 may be downconverted by the frequency translator 222 before being provided to the receive path of the far end 204. The signal may be received by the receive air frame detector 228. A time difference for signal propagation along the receive path of the far end 204 is measured between point C (receive air frame detector 228) and point D (data receive system 230). For example, a counter may begin at the receive air frame detector 228 and the counter may terminate as data or signal is received by is propagated to the data receive system 230 (or a point in the data receive system 230). The time of data propagation from point C to point D is denoted as $T_{CD}$ (e.g., a second time is measured).

In various embodiments, the signal may be provided from the receive path of the far end 204 to the transmit path of the far end 204 (e.g., the signal and/or data received from the near end 202 may be re-routed from the receive path of the far end 204 to be transmitted back to the near end 202). For example, the frame may be turned around at the remote system to be received back by the originating system.

A time difference for signal propagation from the receive path of the far end 204 to the transmit path of the far end 204 may be measured between point D (data receive system 230) and point P (data input transmit system 224). For example, a counter may begin at the data receive system 230 and the counter may terminate as data or signal is received by or is propagated to the data input transmit system 224 (or a point in the data input transmit system 224). The time of data propagation from point D to point P is denoted as $T_{DP}$ (e.g., a third time is measured).

It will be appreciated that the data receive system 230 may comprise two points. For example, a first point may terminate a counter when data or a signal is received from the receive air frame detector 228. A second point may initiate a counter when data or a signal is provided to the data input transmit system 224. In some embodiments, the data receive system 230 comprises a single point where counters may be initiated and/or terminated.

A time difference for signal propagation along the transmit path of the far end 204 may be measured. For example, in a manner similar to the transmit path of the near end 202, time may be measured between point P (data input transmit system 224) and point Q (transmit air frame detector 226). For example, a counter may begin at the data input transmit system 224 and the counter may terminate as data or signal is received by or is propagated to the transmit air frame detector 226 (or a point in the transmit air frame detector 226). The time of data propagation from point P to point Q is denoted as $T_{PQ}$ (e.g., a fourth time is measured).

It will be appreciated that the data input transmit system 224 may comprise two points. For example, a first point may terminate a counter when data or a signal is received from the data receive system 230. A second point may initiate a counter when data or a signal is provided to the transmit air frame detector 226. In some embodiments, the data input transmit system 224 comprises a single point where counters may be initiated and/or terminated.

The signal may be upconverted by the frequency translator 222 before being provided over the wireless link by the antenna 222. The signal may be received by antenna 216 via the communication tower 206. The path between the antenna 222 and the antenna 216 for the return data or return signal is termed herein as a second wireless link.

The signal from the near end 204 may be downconverted by the frequency translator 216 before being provided to the receive path of near far end 202. The signal may be received by the receive air frame detector 212. A time difference for signal propagation along the receive path of the near end 202 is measured between point R (receive air frame detector 212) and point S (data receive system 214). For example, a counter may begin at the receive air frame detector 212 and the counter may terminate as data or signal is received by is propagated to the data receive system 214 (or a point in the data receive system 214). The time of data propagation from point R to point S is denoted as $T_{RS}$ (e.g., a fifth time is measured).

In various embodiments, the signal may be provided from the receive path of the near end 202 to the transmit path of the near end 202 (e.g., the signal and/or data received from the far end 204 may be re-routed from the receive path of the near end 202 to be or as if to be transmitted back to the far end 204).

A time difference for signal propagation from the receive path of the near end 202 (point S) to the beginning of the process where the signal was initially provided to the data input transmit system 208 (point A) may also be measured to determine a length of time signal propagation from point A to point S (e.g., a sixth time is measured).

Those skilled in the art will appreciate that time differences are measured and not necessarily the value of the CLCK signal. As a result, even if there are time differences between the near and far ends, the measurements may still be valid being measurements for the duration of time that has elapsed for signal propagation from one point to another.

Those skilled in the art will appreciate that all or some of the six measurements may be repeated any number of times. The measurements in the aggregate may be utilized to determine phase and/or time. For example, the system may perform measurements hundreds of times before averaging the measurements (e.g., either individually averaged or combined and averaged). The averages of the six measurements may be utilized to determine signal propagation over the wireless link and/or determine phase and/or time.

The six time measurements may be utilized to determine time for signal propagation over the wireless link between the near end 202 and the far end 204. In some embodiments, one or both of the ends provide time measurements to the other. In some embodiments, the data protocol between the two ends is proprietary (e.g., the two transceivers are bookended by a proprietary protocol). The time measurements may be provided in data overhead transmitted from one end to the other (e.g., similar to how telemetry information may be conveyed), provided as separate signals, or provided over dedicated networks (e.g., cables or other networks).

In various embodiments, systems and methods described herein may allow for the transfer phase over radio networks (e.g., packet switched radio networks) using bidirectional radio links.

There are techniques used in terrestrial networks (fiber or copper), that use techniques to estimate the phase/ time (vs. actual measurement). The phase estimation techniques that are used predominantly in the fiber based networks are (typically) not robust/ or accurate as they rely on estimation rather than measurement.

Figure 3:
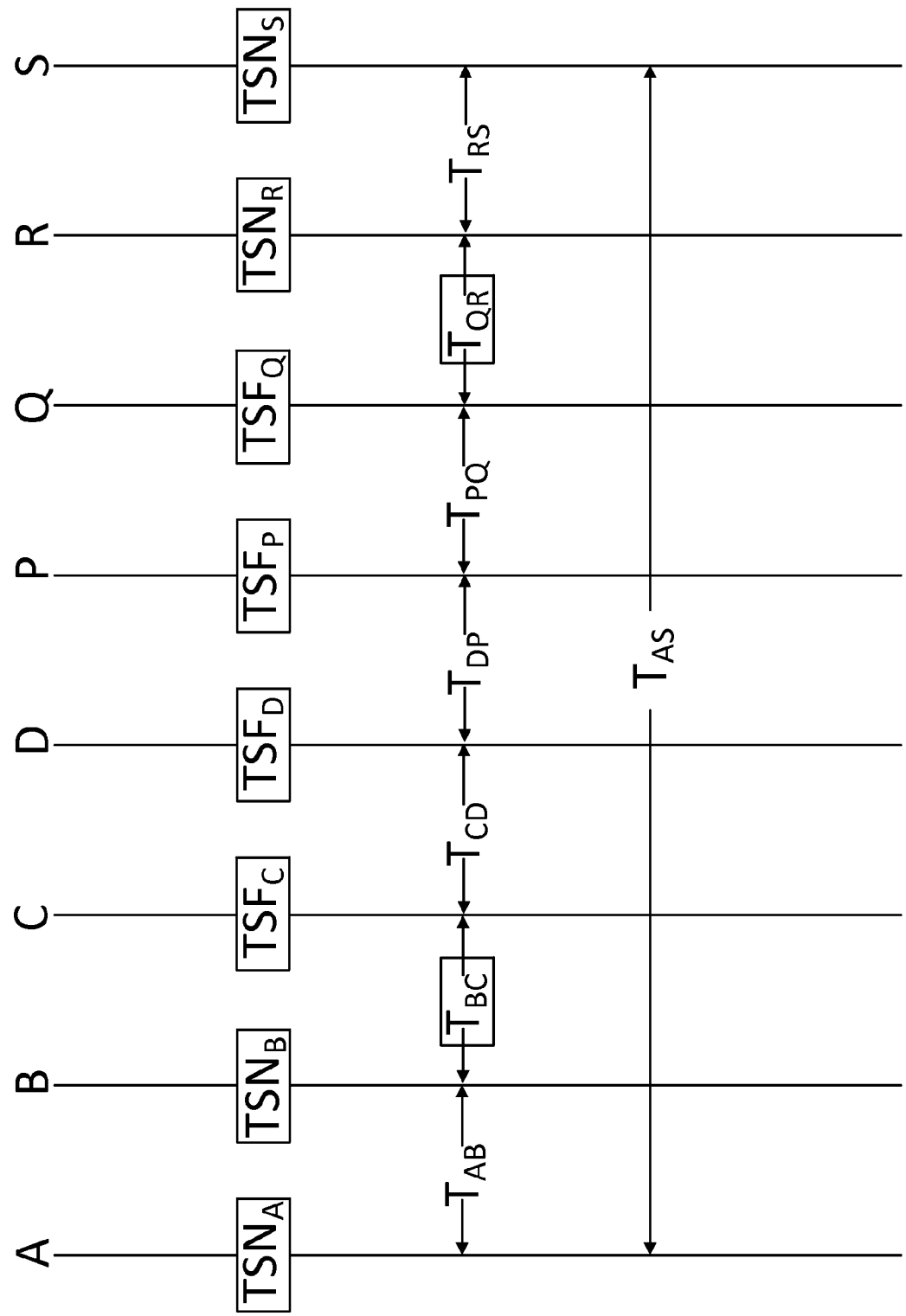
FIG. 3 depicts time determinations utilized to determine phase over a wireless link in some embodiments.

FIG. 3 depicts time determinations utilized to determine time phase over a wireless link in some embodiments. The time measurements may be utilized to determine the time the data propagated along the first wireless link (e.g., transmit air frame detector 210 of the near end 202 to the receive air frame detector 228 of the far end 204) and/or the time the data propagated along the second wireless link (e.g., transmit air frame detector 226 of the far end 204 to the receive air frame detector 212 of the near end 202).

The first and second wireless links (e.g., $T_{BC}$ and $T_{QR}$, respectively) may be determined based on the first six measurements. For example, $T_{BC}+T_{QR}$ may be equal to ($T_{AS}-[T_{AB}+T_{CD}+T_{DP}+T_{PQ}+T_{RS}]$).

Those skilled in the art will appreciate that although latencies in different transceivers may be different, the latency along a wireless link between the two different transceivers may be consistent for period of time (e.g., the propagation of radio waves may be very symmetric in terms of propagation velocity). As a result, latency and/or signal propagation time for the first wireless link may be equal to the latency and/or signal propagation time for the second wireless link. In various embodiments, $T_{BC}$ may equal $T_{QR}$.

In various embodiments, $T_{BC}=T_{QR}=0.5\times(T_{AS}-[T_{AB}+T_{CD}+T_{DP}+T_{PQ}+T_{RS}])$ $T_{BC}$ and/or $T_{QR}$ may be utilized to correct phase difference and or correct time on different units. For example, the near end may determine the time that a part of the far end 204 may receive a signal. The near end 202 may provide the signal as well as the expected time the component of the far end 204 is to receive the signal (e.g., the information may be contained in overhead of data carried by the signal, provided in another signal, or provided via another network out of band to the far end 204). The far end 204 may receive the signal and utilize the time information to correct one or more clocks associated with the far end 204.

For example, useful temporal relationships in the forward direction are:

Event@$A$=Event @$D-[T_{AB}+T_{BC}+T_{CD}]$

Event@$C$=Event @$B-[T_{BC}]$

Similar relationships in the return path are

Event@$S$=Event @$P-[T_{PQ}+T_{BC}+T_{RS}]$

Event@$R$=Event @$Q-[T_{BC}]$

Those skilled in the art will appreciate that generation of synchronized phase or time events may be achieved by implementing delay logic, equivalent to the above delays, corresponding to points as indicated above. Those skilled in the art will appreciate that there may be many ways to generate synchronized phase or time events.

In another example, a controller on the near end 202 may determine when the receive air frame detector 228 is to receive a signal from the transmit air frame detector 210. The controller may store time information regarding when the receive air frame detector 228 is expected to receive the signal and provide that information within the signal (or within another signal) to the far end 204. A controller on the far end 204 may determine (e.g., based on the $CCLK_{(slave)}$) when the signal is received by the receive air frame detector 228 and compare the receive time with the time information from the near end 202. Discrepancies may be corrected by the far end 204 and/or information shared between any number of transceivers or other devices to confirm and/or correct clocks, frequency, or the like.

Figure 4:
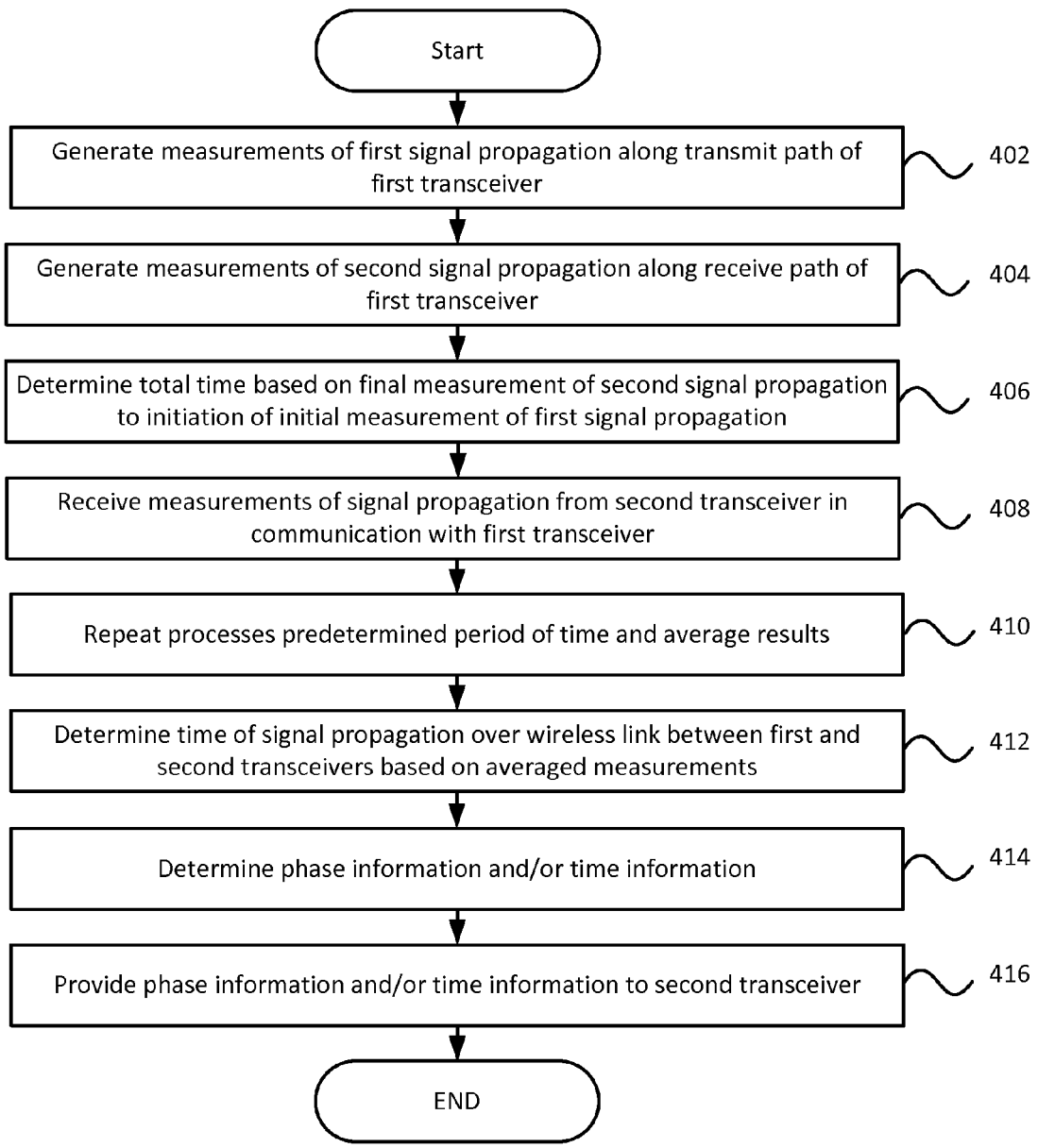
FIG. 4 is a flow diagram for determining phase and transferring phase and/or time information from one transceiver to another in some embodiments.

FIG. 4 is a flow diagram for determining phase and transferring phase and/or time information from one transceiver to another in some embodiments. In step 402, a controller (e.g., measurement controller) of a first transceiver (e.g., near end 202 of FIG. 2) generates measurements of first signal propagation along transmit path of first transceiver. For example, the controller may measure a first time of signal propagation from the data input system 208 and the transmit air frame detector 210 (e.g., the controller measures $T_{AB}$). The controller may measure $T_{AB}$ in any number of ways. The first signal may be transmitted to the second transceiver over the wireless link.

In step 404, the measurement controller may generate measurements of a second signal propagation along a receive path of the first transceiver. For example, the first transceiver may receive a second signal from the second transceiver over the wireless link. The first signal and the second signal may be associated. For example, the first and second signal may be the same signal or the second signal may be initiated to be transmitted based on the first signal.

In some embodiments, the controller may measure a fifth time of signal propagation from the receive air frame detector 212 to the data receive system 214 (e.g., the controller measures $T_{RS}$). The controller may measure $T_{RS}$ in any number of ways.

In step 406, the controller may determine a total time based on a final measurement of second signal propagation (e.g., when the second signal reaches the data receive system 214) to initiation of the initial measurement of the first signal propagation (e.g., when the first signal reached the data input system 208 (e.g., the controller measures a sixth time measurement or $T_{AS}$). The controller may measure $T_{AS}$ in any number of ways.

In step 408, the controller may receive measurements of signal propagation from second transceiver in communication with the first transceiver. For example, the controller may receive measurements in overhead of data from the second transceiver or receive the measurements in any number of ways.

In various embodiments, a controller on the second transceiver may make similar measurements to the controller on the first transceiver. For example, the controller on the second transceiver may measure time for first signal propagation from the receive air frame detector 228 to the data receive system 230 (e.g., a second time measurement $T_{CD}$). The controller on the second transceiver may also initiate a second signal to transmit once the first signal reaches the data receive system 230 or otherwise triggers the transmission of the second signal. The second signal may be the first signal routed from the data receive system 230 to the data input system 224.

The controller may measure the time from the first signal is received at the data receive system 230 to the time the second signal is received at the data input transmit system 224 (e.g., a third time measurement $T_{DP}$). Further, the controller may measure the time the second signal passes from the data input transmit system 224 to the transmit air frame detector 226 (e.g., a fourth time measurement $T_{PQ}$).

The controller of the second transceiver may provide the second, third, and fourth time measurements (e.g., $T_{CD}$, $T_{DP}$, and $T_{PQ}$) to the first transceiver. In some embodiments, the controller of the second transceiver may receive the time measurements from the first transceiver (e.g., the first, fifth, and sixth time measurements or $T_{AB}$, $T_{RS}$, and $T_{AS}$). Either or both controllers of both transceivers may determine phase, time, and/or frequency based on the measurements.

In step 410, the process may be repeated a predetermined period of time and the results may be averaged. For example, the measurements $T_{AB}$, $T_{CD}$, $T_{DP}$, $T_{PQ}$, $T_{RS}$, and $T_{AS}$ may be taken any number of times over any number of signals. The measurements may be averaged or otherwise combined to generate aggregate measurements for each of $T_{AB}$, $T_{CD}$, $T_{DP}$, $T_{PQ}$, $T_{RS}$, and $T_{AS}$ or any combination. By increasing number of measurements, local noise effects (e.g., local jitter or local variations) may be reduced.

In step 412, the controller or other module may determine time of signal propagation over wireless link between the first and second transceivers based on the measurements. As discussed herein, the measurements may be used to calculate the time signals propagate over the wireless link (e.g., $T_{BC}=T_{QR}=0.5\times(T_{AS}-[T_{AB}+T_{CD}+T_{DP}+T_{PQ}+T_{RS}]))$.

In step 414, the controller or another module may determine phase information and/or time information based on the measurements (e.g., based on $T_{BC}$ and/or $T_{QR}$). Each controller of each transceiver may make independent determinations or may receive phase or time information from another transceiver (e.g., in band or out of band) in step 416. The phase or time information may be any information to assist the transfer of phase and/or time.

Figure 5:
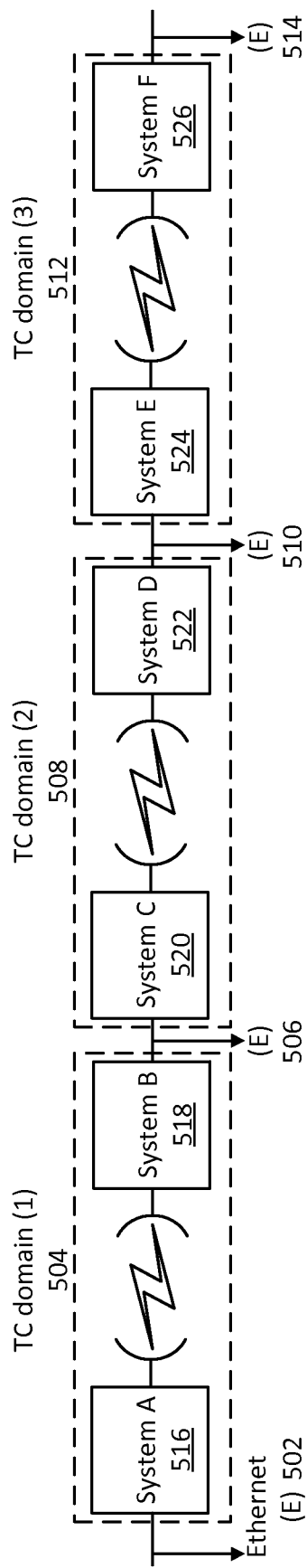
FIG. 5 is a block diagram for determining phase over multiple wireless links in transparent clock domains separated by Ethernet in some embodiments.
Figure 6:
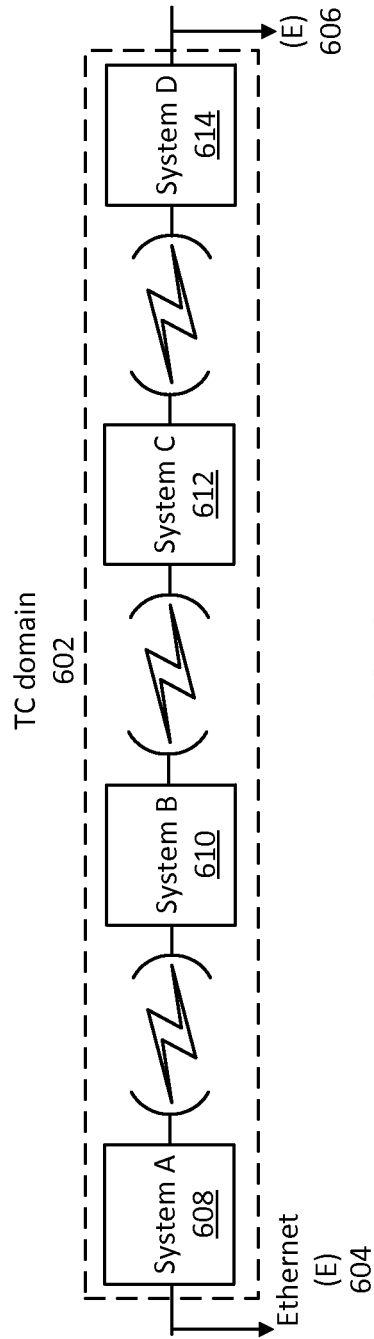
FIG. 6 is a block diagram for determining phase over multiple wireless links in some embodiments.

FIG. 5 is a block diagram for determining phase over multiple wireless links in transparent clock domains separated by Ethernet in some embodiments. In various embodiments, it will be appreciated that the concepts discussed herein may be extended to include wireless links (e.g., microwave links) across multiple systems. For example, concepts in some embodiments may be extended as single transparent clock domain as shown in FIG. 6 or multiple domains as shown in FIG. 5.

The system of FIG. 5 may utilize a transparent clock to minimize packet delay variation. IEEE 1588 or PTP specifies the protocol for transferring frequency and time information between "edges" of physical systems typically the Timing (PTP) masters and "Timing (PTP) slaves." IEEE 1588 is silent, however, on recovering signals on the other end. The intermediate nodes that participate in this time transfer are called transparent clocks and boundary clocks. Typically these are single physical systems.

In various embodiments, systems and methods may allow transparent clocks and boundary clocks to be distributed across geographies and span radio links, without sacrificing performance. These figures illustrate the simple cases of linear topologies—more complex connection topologies are also possible (e.g., trees, meshes, or the like).

A transparent clock is often defined as a switch because it does not operate as a PTP node in an IEEE 1588 system. A transparent switch may modify timing contents of packets to account for delay caused by the switch. For example, a transparent switch may calculate how much time a "sync" packet spends inside the switch, and then modifies the timestamp of an associated "follow up" packet to account for the delay. The use of transparent switches allows the PTP nodes to operate as if they were all part of one LAN segment connected by hubs. A transparent clock domain may span, for example as depicted in FIG. 5, two physical systems and one radio link. In a wireless system, the modified timestamp may introduce additional phase error because the wireless link is not constant (when compared to terrestrial links).

FIG. 5 comprises three transparent clock domains 504, 508, and 512. Transparent clock domain 504 comprises system A 516 in communication over a wireless link with system B 518. Transparent clock domain 508 comprises system C 520 in communication over a wireless link with system D 522. Transparent clock domain 512 comprises system E 524 in communication over a wireless link with system F 526. The transparent clock domains 504, 508, and 512 may communicate over Ethernet (e.g., Ethernet 506 and 510, respectively). Further the transparent clock (1) 504 may receive signals and/or data over Ethernet 502 and the transparent clock domain (3) 512 may provide signals and/or data over Ethernet 514.

In various embodiments, time for signal propagation over a wireless link may be determined between any two systems across a wireless link (e.g., between system A 516 and system B 518, between system C 520 and system D 522, and between system E 524 and system F 526). Phase and/or time may be determined based on the time measurements. The phase and/or time determinations (e.g., phase information and/or time information based on the measurements) may be shared between systems across different transparent clock domains (e.g., via Ethernet). In one example, the phase and/or time information may be utilized by the different transparent clocks when received over Ethernet. Using techniques in some embodiments as described herein, a distributed transparent clock may encompass multiple systems (e.g., two systems) and the link.

FIG. 6 is a block diagram for determining phase over multiple wireless links in some embodiments. Transparent clock domain 602 may span multiple systems and radio links such as, for example, system A 608, system B 610, system C 612, and system D 614. System A 608 may communicate over a radio or microwave link with system B 610. System B 610 may communicate over a radio or microwave link with system C 612. System C 612 may communicate over a radio or microwave link with system D 614. System A 608 may receive signals and/or data from Ethernet 604 and system D 614 may provide signals and/or data over Ethernet 606.

Similar to FIG. 5, in various embodiments, time for signal propagation over a wireless link may be determined between any number of systems (e.g., between system A 608 and system B 610, between system B 610 and system C 612, and between system C 612 and system D 614). Those skilled in the art will appreciate that these techniques may not be limited to two systems but may include any number of systems. Phase and/or time may be determined based on the time measurements. The phase and/or time determinations (e.g., phase information and/or time information based on the measurements) may be shared between systems in the same transparent clock domains.

Figure 7:
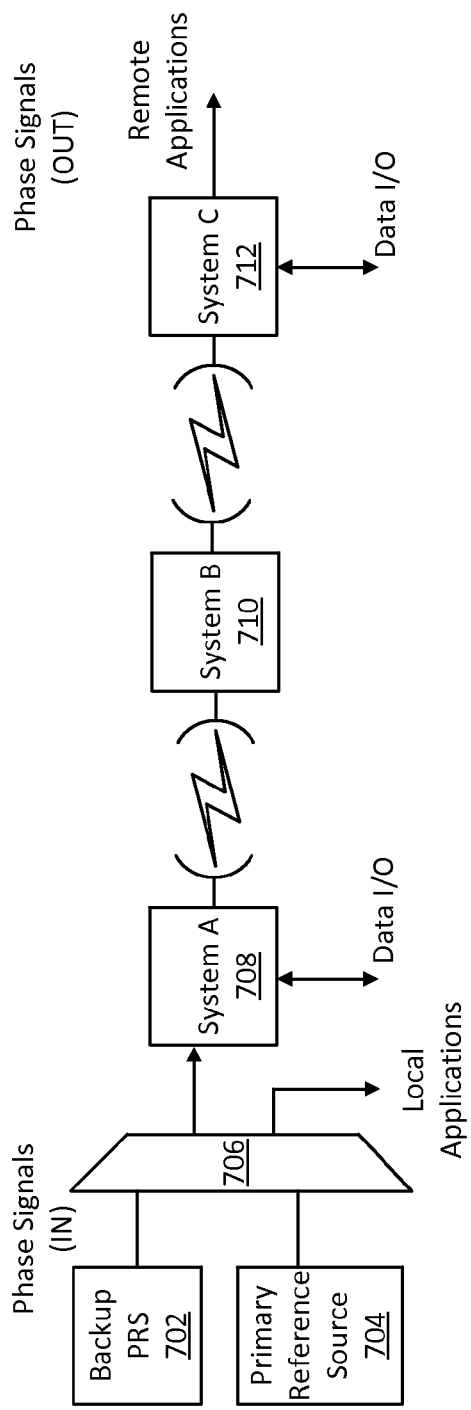
FIG. 7 is a diagram of utilization of phase and/or time determination as a backup in some embodiments.

FIG. 7 is a diagram of utilization of phase and/or time determination as a backup in some embodiments. GPS systems are often used to provide phase and wall clock time services. In the prior art, phase and wall clock time is distributed using dedicated cabling with in a given geographical area (same physical facility). When common phase and time reference is needed over diverse area, either GPS is used or an expensive dedicated timing transport network is deployed. GPS systems often provide phase and wall clock time services for supervisory and control applications. The supervisory and control applications may supervise and control critical infrastructure applications such as, for example, utilities, first responder networks, financial, and high frequency trading applications.

Industries (e.g., Utilities and other critical infrastructure sector applications) typically use radio/ microwave links for data networking. This method allows the radio data network to distribute phase and wall clock time.

Those skilled in the art will appreciate that GPS is vulnerable to jamming or spoofing. Various techniques utilized herein may be utilized to transfer frequency, phase, and/or time between geographically diverse locations. Time signals from remote locations could backup for a "local" system in case GPS or other technique is compromised. The signals may also be utilized to as enhancement or verification of GPS signals. In some embodiments, phase, frequency, and time information provided by measurement techniques as discussed herein may be used to calibrate quality of phase and frequency over wireless links and track history. As a result, if GPS fails or is jammed, corrections may be made.

FIG. 7 comprises a backup primary reference source 702 and a primary reference source 704 coupled to a multiplexer 706. In one example, the primary reference source 704 may be GPS-based and/or systems A, B, or C may utilize GPS-based techniques.

The backup primary reference source 702 may provide signals based on phase and/or time determination discussed herein. For example, measurements may be taken between any two systems to determine phase and/or time based on methods and systems described herein. The measurements may allow for the generation of the backup primary reference source 702.

The multiplexer 706 may provide signals from the backup primary reference source 702 or the primary reference source 704 to the systems A 708 and/or local applications. System A 708 may communicate over a wireless link (e.g., microwave link) with system B 710. System B 710 may communicate over a wireless link with system C 712. System C 712 may provide the signal from the backup primary reference source 702 or the primary reference source 704 to remote applications. System A 708, system B 710, and system C 712 may be geographically diverse.

In some embodiments, points within transmit or receive paths of communication transceivers (e.g., system A 708 and system B 710) may measure time to propagate signals through a wireless link. Similar measurement may be made between system B 710 and system C 712. The measurements may be utilized to measure latency and/or propagation through the wireless channels. Utilizing information regarding time associated with the wireless channels (e.g., from the backup primary reference source 702), phase and/or time may be determined by or for systems A, B, and/or C.

Figure 8:
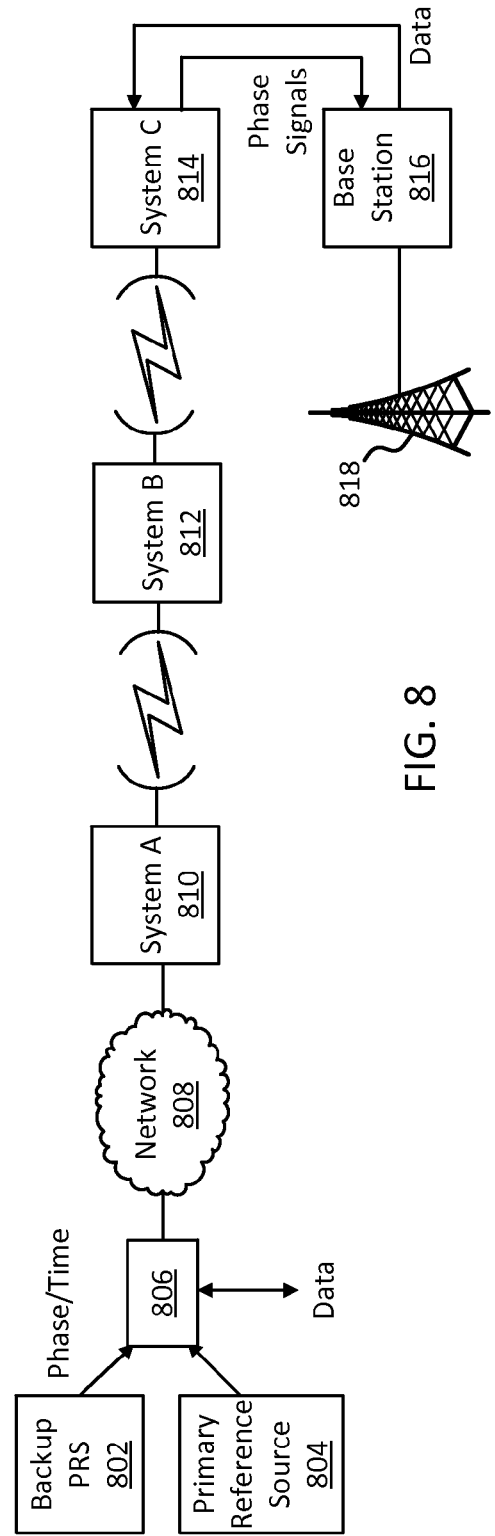
FIG. 8 is a diagram of utilization of phase and/or time determination as a backup for a telecom system in some embodiments.

FIG. 8 is a diagram of utilization of phase and/or time determination as a backup for a telecom system in some embodiments. The telecom system of FIG. 8 may be, for example, an LTE system. In various embodiments, systems and methods for determining phase and or frequency may be utilized for mobile backhaul. Such systems may use, in some embodiments, systems and methods described herein for phase and frequency transfer.

FIG. 8 comprises a backup primary reference source 802 and a primary reference source 804 coupled to a multiplexer 806. The backup primary reference source 802 may provide signals based on phase and/or time determination discussed herein. For example, measurements may be taken between any two systems to determine phase and/or time based on methods and systems described herein. The measurements may allow for the generation of the backup primary reference source 802.

The multiplexer 806 may provide signals from the signal from backup primary reference source 802 or the signal from primary reference source 804 to the systems A 810 over network 808. The multiplexer 806 may provide the signal from backup primary reference source 802 or the signal from primary reference source 804 to local applications. System A 810 may communicate over a wireless link (e.g., microwave link) with system B 812. System B 812 may communicate over a wireless link with system C 814. System C 814 may provide phase signals to the base station 816 which may communicate with communication tower 818. The base station 816 may provide data back to system C 814 (e.g., to provide to any of the systems in FIG. 8).

FIG. 9 is a block diagram for determining and providing phase and/or time information in a system of distributed boundary clocks in some embodiments. A boundary clock is an IEEE 1588 component that allows the synchronization of IEEE 1588 clocks across systems or subnets (e.g., IEEE 1588 defines the precision time protocol (PTP)).

To minimize tack delay variation, a boundary clock (i.e., a switch-clock combination) modifies timing packets coming into the switch with fresh timestamped timing packets exiting the switch so time effectively jumps the queue. This is useful in distributing the timestamping load from a master clock if there are thousands of slaves, for example.

An effective way to reduce the effect of jitter is the use of IEEE 1588 boundary clocks or transparent switches. A switch acting as a boundary clock may run a PTP protocol, and may be synchronized to an attached master clock. The boundary clock in turn acts as a master clock to all attached slaves. The goal is that all internal latencies and jitter in the switch is compensated and do not affect synchronization accuracy. Unfortunately, estimations of phase across wireless links may be poor and the boundary clock may perpetuate the problem.

FIG. 9 comprises three boundary clocks 904, 908, and 912. Boundary clock 904 comprises system A 916 in communication over a wireless link with system B 918. Boundary clock 908 comprises system C 920 in communication over a wireless link with system D 922. Boundary clock 912 comprises system E 924 in communication over a wireless link with system F 926. The boundary clocks 904, 908, and 912 may communicate over Ethernet (e.g., Ethernet 906 and 910, respectively). Further the boundary clock (1) 904 may receive signals and/or data over Ethernet 902 and the boundary clock (3) 912 may provide signals and/or data over Ethernet 914.

In various embodiments, time for signal propagation over a wireless link may be determined between any number of systems across a wireless link (e.g., between system A 916 and system B 918, between system C 920 and system D 922, and between system E 924 and system F 926). Those skilled in the art will appreciate that these techniques may not be limited to two systems but may include any number of systems. Phase and/or time may be determined based on the time measurements. The phase and/or time determinations (e.g., phase information and/or time information based on the measurements) may be shared between systems across different boundary clocks (e.g., via Ethernet). In one example, the phase and/or time information may be utilized by the different boundary clocks when received over Ethernet.

FIG. 10 is a block diagram for determining phase over multiple wireless links in some embodiments. Boundary clock 1002 may span multiple systems and radio links such as, for example, system A 1008, system B 1010, system C 1012, and system D 1014. System A 1008 may communicate over a radio or microwave link with system B 1010. System B 1010 may communicate over a radio or microwave link with system C 1012. System C 1012 may communicate over a radio or microwave link with system D 1014. System A 1008 may receive signals and/or data from Ethernet 1004 and system D 1014 may provide signals and/or data over Ethernet 10010.

Similar to FIG. 9, in various embodiments, time for signal propagation over a wireless link may be determined between any two systems (e.g., between system A 1008 and system B 1010, between system B 1010 and system C 1012, and between system C 1012 and system D 1014). Phase and/or time may be determined based on the time measurements. The phase and/or time determinations (e.g., phase information and/or time information based on the measurements) may be shared between systems in the same boundary clock.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

In some embodiments, the controller or measurement controller is a module that is controlled by a processor with memory. The controller may be controlled by instructions executable by the processor. Each end (e.g., far end or near end) may comprise at least one processor and memory.

The above-described functions and components can be comprised of instructions that are stored on a storage medium such as a non-transitive computer readable medium (e.g., hard disk, CD, thumb drive, DVD, SSD, or the like). The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:
1. A method comprising:
  measuring a first time for a first signal to propagate between a point in a first end data input transmit system and a point in a first end transmit air frame detector;
  measuring a second time for the first signal to propagate between a point in a second end receive air frame detector and a point in a second end data receive system;
  measuring a third time for the first signal to propagate between the point in the second end data receive system and a point in a second end data input transmit system;

measuring a fourth time for the first signal to be received by the point in the second end data transmit system and a second signal to be received at a point in a second end transmit air frame detector;

measuring a fifth time for the second signal to propagate between a point in a first end receive air frame detector and a point in a first end data receive system;

measuring a sixth time based on when the second signal is received by the point in the first end data receive system to when the first signal is received by the point in the first end data input transmit system;

determining a seventh time for a first data to propagate between the point in the first end transmit air frame detector and the point in the second end receive air frame detector based on the first, second, third, fourth, fifth and sixth time; and determining a phase of a third signal including the first data, the determining the phase being based at least in part on the seventh time; wherein the determining the seventh time comprises subtracting the first time, the second time, the third time, the fourth time, and the fifth time from the sixth time to determine a link time, and dividing the link time by two.

2. The method of claim 1, wherein the seventh time is a time for the first signal to propagate across a wireless link between two transceivers.

3. The method of claim 2, further comprising determining an eighth time equivalent to the seventh time, the eighth time being a time for the second signal to propagate across the wireless link between the point in the second end transmit air frame detector to the point in the first end receive air frame detector.

4. The method of claim 2, wherein the wireless link is a microwave link.

5. The method of claim 2, wherein the wireless link is a Radio Frequency (RF) link.

6. The method of claim 1, wherein the first signal is the second signal.

7. The method of claim 1, wherein frequency is locked between a first end transceiver and a second end transceiver, wherein the first end transceiver comprises the first end data input transmit system, the first end transmit air frame detector, the first end receive air frame detector, and the first end data receive system, further wherein the second end transceiver comprises the second end data input transmit system, the second end transmit air frame detector, the second end receive air frame detector, and the second end data receive system.

8. The method of claim 1, wherein the determined phase is provided from a first end transceiver across a network to a second end transceiver.

9. The method of claim 8, wherein the determined phase is provided from the first end transceiver to the second end transceiver within overhead of third data transmitted from the first end transceiver to the second end transceiver.

10. The method of claim 8, wherein the determined phase is provided from the first end transceiver to the second end transceiver over a dedicated channel.

11. The method of claim 1, wherein an end transceiver utilizes the determined phase as a backup to Global Positioning System (GPS) functions.

12. The method of claim 1, further comprising determining when third data is to be received at a predetermined point in an end transceiver and providing a time, based on the determining when the third data is to be received at the predetermined point, to the end transceiver to transfer a clock value.

13. A system comprising:

a first end transceiver comprising a controller configured to measure a first time for a first signal to propagate between a point in a first end data input transmit system and a point in a first end transmit air frame detector, a fifth time for a second signal to propagate between a point in a first end receive air frame detector and a point in a first end data receive system, and a sixth time for the second signal to propagate between the point in the first end data receive system and when the first signal is received by the point in the first end data input transmit system;

a second end transceiver comprising a controller configured to measure a second time for the first signal to propagate between a point in a second end receive air frame detector and a point in a second end data receive system, a third time for the second signal to propagate between the point in the second end data receive system and a point in a second end data input transmit system, and a fourth time for the second signal to propagate between the point in the second end data input transmit system and a point in a second end transmit air frame detector;

a phase determination module configured to determine a seventh time for a first data to propagate between the point in the first end transmit air frame detector and the point in the second end receive air frame detector based on the first, second, third, fourth, fifth, and sixth time and determine a phase of the first data at a predetermined point in the second end transceiver based on the seventh time; wherein the determining the seventh time comprises subtracting the first time, the second time, the third time, the fourth time, and the fifth time from the sixth time to determine a link time, and dividing the link time by two; and a communication module configured to provide information regarding the determined phase from the first end transceiver to the second end transceiver.

14. The system of claim 13, wherein the second end transceiver is configured to recover phase based on the information regarding the determined phase.

15. The system of claim 13, wherein the second end transceiver is configured to recover a clock signal based on the information regarding the determined phase.

16. The system of claim 13, wherein a frequency is locked between the first end transceiver and the second end transceiver.

17. The system of claim 13, wherein the second end transceiver utilizes the determined phase as a backup to Global Positioning System (GPS) functions.

* * * * *